United States Patent
Klein et al.

(10) Patent No.: US 7,309,097 B2
(45) Date of Patent: Dec. 18, 2007

(54) COVER FOR PROTECTING THE OCCUPANTS OF A MOTOR VEHICLE HAVING AN OPENABLE ROOF

(75) Inventors: Berthold Klein, Rutesheim (DE); Emil Schnell, Bad Friedrichshall (DE); Thomas Halbweiss, Remseck (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 11/530,252

(22) Filed: Sep. 8, 2006

(65) Prior Publication Data

US 2007/0057539 A1    Mar. 15, 2007

(30) Foreign Application Priority Data

Sep. 9, 2005    (DE) .................... 10 2005 043 224

(51) Int. Cl.
*B60J 10/10*    (2006.01)
(52) U.S. Cl. .............................. 296/107.01; 296/187.05
(58) Field of Classification Search ........... 296/107.01, 296/187.05; 280/748, 749
See application file for complete search history.

(56) References Cited

U.S. PATENT DOCUMENTS 3,169,781 A * 2/1965 Abruzzino ................. 280/749
3,494,633 A * 2/1970 Malloy ........................ 280/749
2005/0242550 A1* 11/2005 MacNee .................. 280/730.2
2007/0194604 A1*  8/2007 Nygaard ................. 296/187.09

FOREIGN PATENT DOCUMENTS

| DE | 197 49 552 A1 | 5/1999 |
| DE | 101 25 066 A1 | 12/2001 |
| DE | 102 15 836 C1 | 12/2003 |
| DE | 102 36 511 B3 | 2/2004 |
| DE | 102 42 440 A1 | 3/2004 |

* cited by examiner

*Primary Examiner*—Kiran B. Patel
(74) *Attorney, Agent, or Firm*—Brooks Kushman P.C.

(57) ABSTRACT

A covering apparatus protects motor vehicle occupants from an openable roof of the vehicle in which the roof is movable along an enveloping surface between a stored position in which the roof is opened and a closed position in which the roof is closed. The apparatus includes a cover movable between a rest position in which the cover is stowed and a protecting position in which the cover is extended, wherein the cover moves between the rest position and the protecting position without intersecting the enveloping surface of the roof prior to or during movement of the roof between the stored and closed positions of the roof. In the resting position, the cover is located between the vehicle interior and the enveloping surface formed by the opening and closing motion of the roof.

20 Claims, 11 Drawing Sheets

COVER FOR PROTECTING THE OCCUPANTS OF A MOTOR VEHICLE HAVING AN OPENABLE ROOF

CROSS-REFERENCE TO RELATED APPLICATIONS

This application claims foreign priority benefits under 35 U.S.C. § 119(a)-(d) to DE 10 2005 043 224.7, filed Sep. 9, 2005, which is hereby incorporated by reference in its entirety.

BACKGROUND OF THE INVENTION

1. Field of the Invention

The present invention relates to a cover for protecting occupants of a motor vehicle having an openable roof movable between a stored position and a closed position in which the cover is movable between a resting position and a protecting position.

2. Background Art

Soft-tops or folding tops for motor vehicles having an openable roof may be moved between a stored position and a closed position. Such soft-tops or folding tops may be provided with an additional covering which, for example, covers otherwise visible functional parts of the soft-top or folding top. DE 42 10 487 A1 discloses a folding top to which an inner covering is additionally attached. The attachment is made by a U-shaped clamping frame which is open toward the underside of the rear window of the motor vehicle. It is disadvantageous that, despite the additionally provided covering, during opening and closing of the folding top a possible hazard could result from occupants coming into contact with moving parts, in particular due to the comparatively complex mechanical system and relative motions of the components of the folding top.

SUMMARY OF THE INVENTION

An object of the present invention is to provide a cover for a motor vehicle having an openable roof in which the cover reduces the hazard to occupants during opening and closing of the roof and in particular prevents direct contact with the mechanical system of the roof from the interior of the vehicle.

In carrying out the above object and other objects, the present invention provides a covering apparatus for protecting motor vehicle occupants from an openable roof of the vehicle in which the roof is movable along an enveloping surface between a stored position in which the roof is opened and a closed position in which the roof is closed. The apparatus includes a cover which is movable between a rest position in which the cover is stowed and a protecting position in which the cover is extended. The cover moves between the rest position and the protecting position without intersecting the enveloping surface of the roof prior to or during movement of the roof between the stored and closed positions of the roof.

In carrying out the above object and other objects, the present invention provides a motor vehicle having an openable roof and a cover. The roof is movable along an enveloping surface between a stored position in which the roof is opened and a closed position in which the roof is closed. The cover is movable between a rest position in which the cover is stowed within the vehicle interior and a protecting position in which the cover is extended within the vehicle interior over a portion of a seat of the vehicle. The cover moves between the rest position and the protecting position without intersecting the enveloping surface of the roof prior to or during movement of the roof between the stored and closed positions of the roof. In the protecting position the cover is located between the vehicle interior and the enveloping surface defined by the opening and closing motion of the roof to protect occupants of the vehicle from the roof.

The cover in accordance with the present invention is characterized in that it may be moved between the stored and the closed positions to the protecting position, before or during a possible adjustment motion of the vehicle roof. The cover is located in the vehicle interior between at least one bodily part of an occupant of the motor vehicle and the movable roof. The sum of all possible motions of the adjustment mechanics of the roof during the opening and closing forms an imaginary enveloping surface, the cover being in its protecting position between the vehicle interior and the imaginary enveloping surface. By moving the cover to the protecting position it is thus possible to completely protect the vehicle occupants from the roof as the roof moves between its stored and closed positions, and to reliably prevent possible contact with the mechanical system of the roof.

In one opaque design of the cover, for example by use of an opaque cover material, the occupants may also be prevented from seeing the opening and closing movements of the roof.

An embodiment provides that the cover may be moved over the head of at least one occupant of the vehicle. In this manner the head may be protected from the motions of the roof. In this manner it is also possible, for example for a vehicle roof that is already opened, to provide sun protection for the occupants of the vehicle.

An embodiment provides that the cover is a roller shade. The roller shade may advantageously be stowed in a very small space and be extended in a simple manner, in particular, manually and/or by a provided drive.

An embodiment provides that the cover may be extended by means of at least one pivotably supported hoop. The hoop may, for example, be fixed to the end of the roller shade (i.e., cover), which is extended by a simple rotational motion. It is also possible to connect the hoop directly to a cover material to allow the cover to be extended.

In an embodiment, the cover may undergo translational motion for moving between its rest position and the protecting position. In this manner it is possible, for example, to move the cover into its rest position by translationally moving the cover in the direction of the vehicle interior. The translational motion may thus be used to stow the cover in the vehicle interior when not in use, so that it does not protrude objectionably and does not detract from the vehicle appearance.

In an embodiment, the cover may be translationally moved to the rolled-in and/or folded-up state. To move the cover from its protecting position to its rest position, it is also possible to first fold-up and/or roll-in the cover and then translationally move it in the direction of the vehicle interior. Changing from the rest position to the protecting position takes place in the opposite direction. However, the motions may also be completely or partially superimposed.

In an embodiment, a drive is provided for moving the cover between the rest position and the protecting position. An embodiment provides that the drive has a linear drive. The linear drive is able to produce the translational motion for moving the cover. A rotational drive may be provided additionally or alone, for example to produce the rotational motion of the hoop to extend the cover. The drive may advantageously be an electric, pneumatic, and/or hydraulic drive which advantageously may be installed in motor vehicles. In addition, the drive may have at least one slide rail for guiding the translational motion.

The above features, and other features and advantages of the present invention are readily apparent from the following detailed descriptions thereof when taken in connection with the accompanying drawings.

DETAILED DESCRIPTION OF THE PREFERRED EMBODIMENT(S)

In the individual figures, identical and/or functionally equivalent parts are provided with the same reference numerals.

FIGS. 1 through 4 illustrate schematic side views of a cover 1 for a motor vehicle 3 having an openable roof 5, the cover being illustrated in various adjustment positions.

Cover 1 is designed to protect an occupant 7 of vehicle 3. In the illustration according to FIGS. 1 through 4 only one occupant 7 is visible. Optionally, cover 1 may also be designed to protect multiple occupants, for example the driver and passengers in vehicle 3.

The function of cover 1 for vehicle 3 is described in greater detail below, with reference to various phases of motion illustrated in FIGS. 1 through 4.

Figure 1:
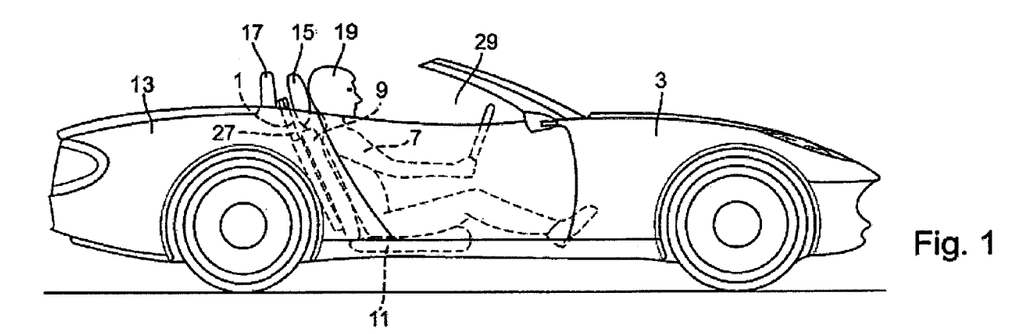
FIGS. 1 through 4 illustrate schematic side views of a motor vehicle having an openable roof and a cover for protecting the occupants, in various adjustment positions of the cover.

In FIG. 1, cover 1 is in a rest position in the interior of vehicle 3, essentially not visible from the outside. Cover 1 is located in the upright position, directly behind a back 9 of a seat 11 for occupant 7 of vehicle 3. Cover 1 is situated between trunk 13 and back 9 of seat 11.

Figure 2:
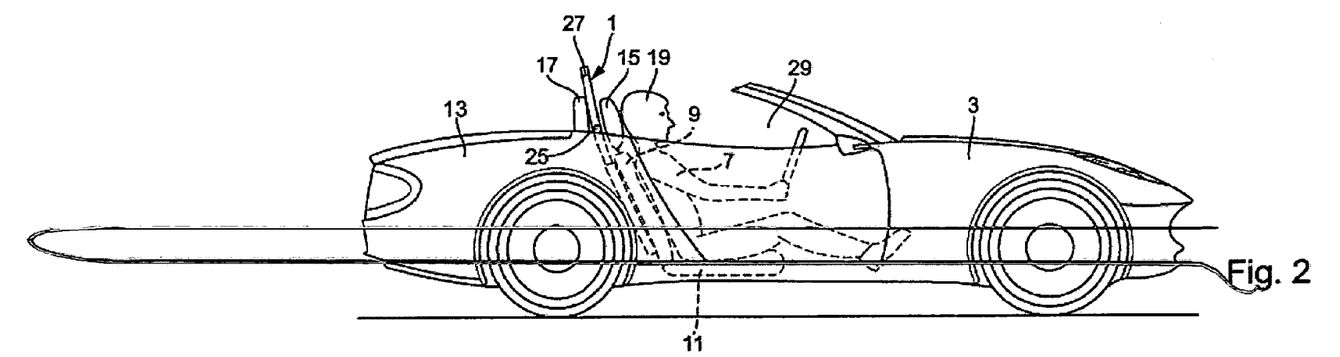

In FIG. 2, cover 1 is in a middle position, and in comparison to the rest position as illustrated in FIG. 1, is translationally moved essentially in the direction of the vertical axis of vehicle 3, inclined slightly backward. For this purpose, cover 1 rises upward between a headrest 15 on seat 11 and a rollover bar 17. Headrest 15 and rollover bar 17 form a corresponding interspace which is designed so that sufficient space remains for the extended cover 1.

Figure 3:
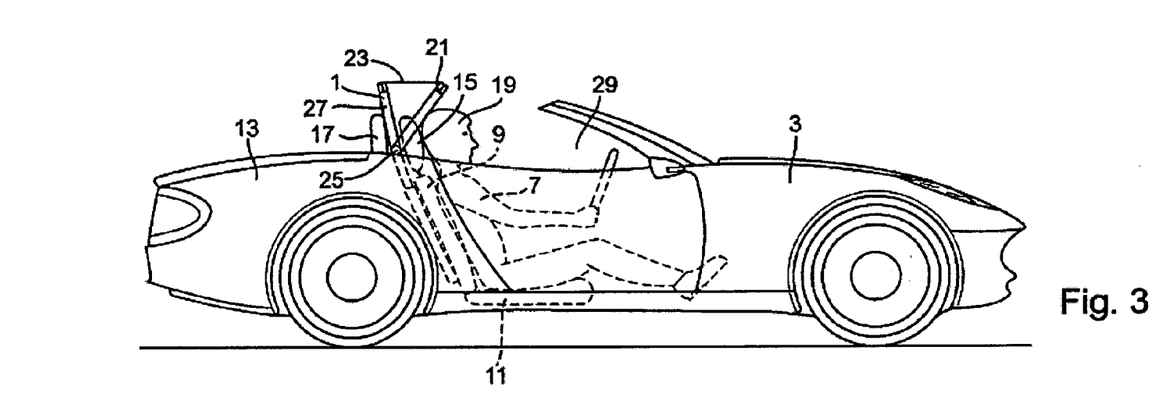

FIG. 3 illustrates cover 1 in a protecting position in which the cover is at least partially located above the head 19 of occupant 7. To this end, cover 1 has a pivotable hoop 21 and a covering 23. Covering 23 is thus partially located above head 19 of occupant 7. Hoop 21 is able to swivel about a swivel bearing 25 for cover 1. Hoop 21 is connected via swivel bearing 25 to a frame 27 for cover 1.

In the positions illustrated in FIGS. 1 and 2, both hoop 21 and frame 27 are in an adjacent position in which the hoop contacts the frame, either inside or outside of same and parallel thereto. Covering 23 in the positions shown in FIGS. 1 and 2 may either be folded into an interspace remaining between hoop 21 and frame 27 or, for example, wound up by means of a roller shade (not illustrated).

Figure 4:
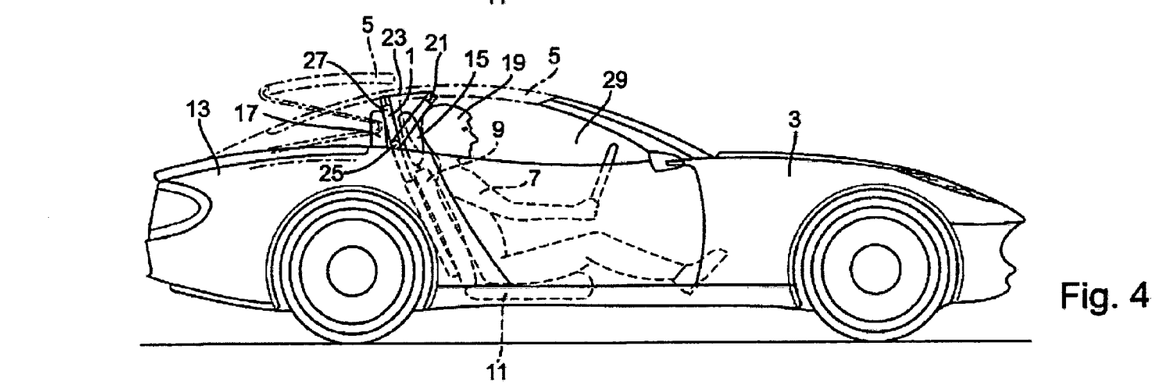

FIG. 4 illustrates cover 1 in the same position as in FIG. 3. In addition, roof 5 of vehicle 3 is shown in schematic form in two different possible positions during a possible adjustment motion between a stored position and a closed position. In the closed position, roof 5 is situated above a passenger compartment 29 of vehicle 3. In the stored position, roof 5 is situated behind occupant 7 in the region of trunk 13 of vehicle 3. To move roof 5 between the stored position and the closed position, the roof must necessarily be moved past and/or above occupant 7, in particular above head 19 of the occupant, by means of a kinematic system (not illustrated in FIGS. 1 through 4). The moving parts of roof 5 pass over an imaginary enveloping surface. Herein, the terms "imaginary enveloping surface", "envelope", "enveloping surface", and the like may be understood to mean a surface that is extended by means of the paths of motion of the movable parts of roof 5 as the roof moves between its stored and closed positions.

It can be seen in FIG. 4 that cover 1 in its protecting position is at least partially located between the enveloping surface of roof 5 and head 19 of occupant 7. Cover 1 may thus advantageously protect occupant 7 or at least one of the occupant's bodily parts from the moving parts of roof 5. For this purpose, cover 1 may advantageously be shifted to its protecting position just before, or, at the latest, during the adjustment motion of roof 5.

Figure 5:
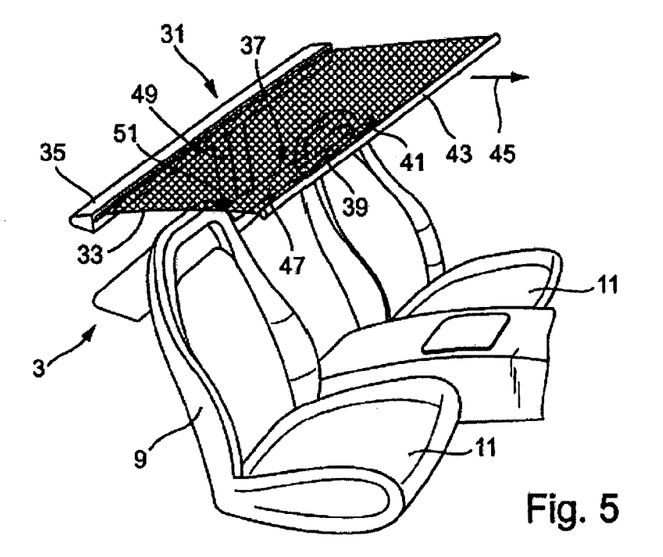
FIG. 5 illustrates a schematic three-dimensional view, seen from the front at an angle from above, of an extended cover having a roller shade.

FIG. 5 illustrates a schematic three-dimensional view, seen from the front at an angle from above, of a cover 31 having a covering 33 and a roller shade 35. Roller shade 35 is used to stow or roll covering 33 for cover 31 in and out, and to extend same. FIG. 5 illustrates cover 31 in a protecting position in which covering 33 is completely extended, i.e., rolled out. To move the covering into this position, cover 31 has a drive 37 with a hydraulic cylinder 39. Hydraulic cylinder 39 has a strut 41 which is connected to a tension rod 43. Tension rod 43 in its longitudinal extension is connected to covering 33 for cover 31, and to roll out the roller shade may be moved to the right (indicated by an arrow 45), in the direction according to FIG. 5, by means of hydraulic cylinder 39 for drive 37. Drive 37 is at least partially located in a first U shaped beam 47. First U-shaped beam 47 is pivotably connected via a swivel bearing 51 to a second U-shaped beam 49. The U-shapes of U-shaped beams 47 and 49 are designed such that second U-shaped beam 49 is able to at least partially accommodate first U-shaped beam 47 together with drive 37. To this end, based on the illustration according to FIG. 5, first U-shaped beam 47 including drive 37 is swiveled in the direction of the vertical axis of vehicle 3. In the resulting approximately perpendicular position (not illustrated in FIG. 5), the two U-shaped beams 47 and 49 form a rounded or oval-shaped profile which surrounds drive 37. Optionally, the U-shaped beams may also have other shapes such as rectangular or polygonal shapes. It is also possible for the folded-up U-shaped beams 47 and 49 to be countersunk in the interior of vehicle 3 by means of a linear drive (not illustrated in FIG. 5). In the protecting position illustrated in FIG. 5, cover 31 is located at least partially above seats 11 of vehicle 3.

Figure 6:
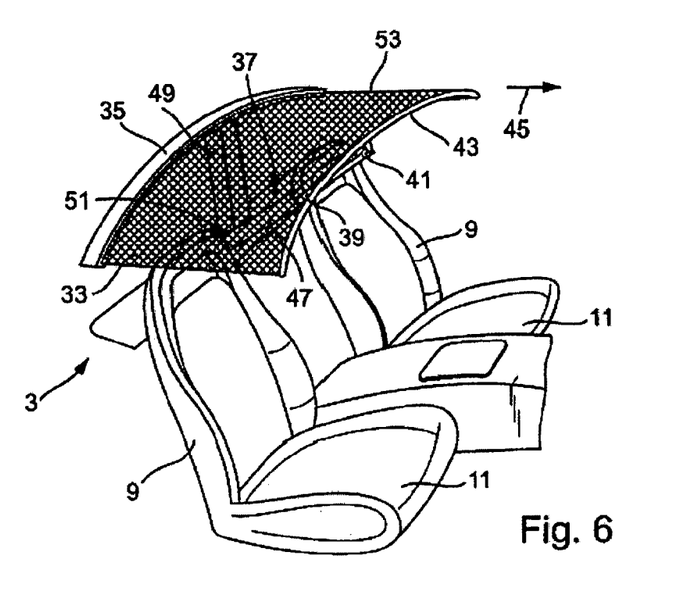
FIG. 6 illustrates the view as in FIG. 5, but with a cover having a curved design.

FIG. 6 illustrates the same view as FIG. 5, except with a cover 53 having a curved design. To this end, in contrast to cover 31 shown in FIG. 5, cover 53 has a curved roller shade 35 and a tension rod 43 which conforms to the curvature of roller shade 35. Roller shade 35 and tension rod 43 are curved in such a way that covering 33 for cover 53 slopes slightly downward to the left and right of the center of vehicle 3, so that the occupants possibly sitting on seats 11 of the vehicle are at least partially encircled, in a manner of speaking, thereby also providing better lateral protection with respect to the vehicle exterior.

Figure 7:
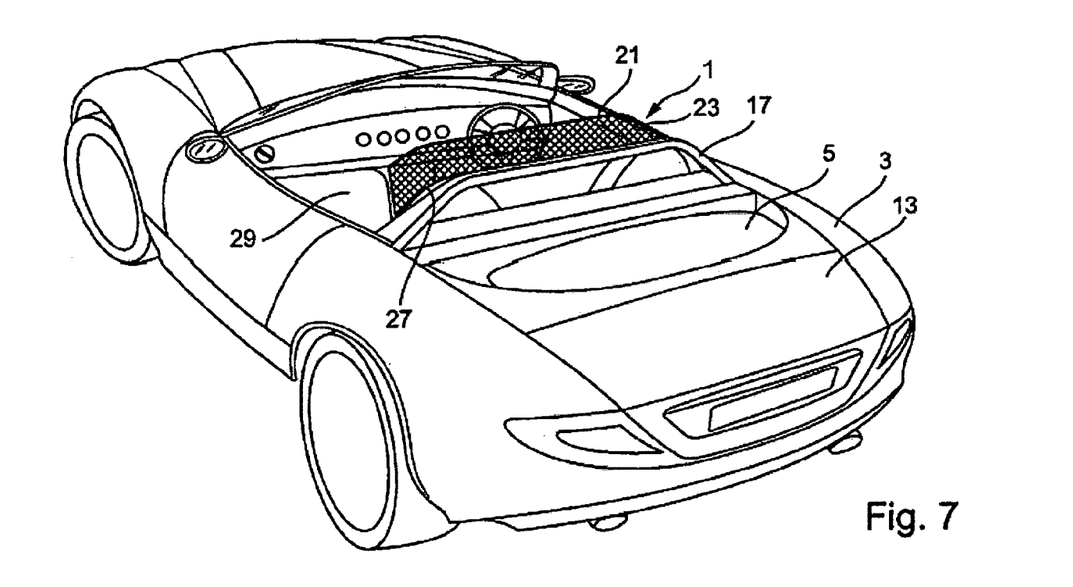
FIG. 7 illustrates a three-dimensional view of a motor vehicle, seen from the rear at an angle from above, with the cover in the protecting position.

FIG. 7 illustrates a three-dimensional view of vehicle 3, seen from the rear at an angle from above, with cover 1 in the protecting position. It can be seen that the opened cover 1, starting from its frame 27, extends forward, at least partially above passenger compartment 29 and therefore above the sitting position of the occupants of vehicle 3. FIG. 7 illustrates vehicle 3 with a completely open roof 5. In this position it is also possible to use cover 1 as a sunscreen or windscreen. To this end, covering 23 for cover 1 may include an appropriate windproof and/or opaque material.

Figure 8:
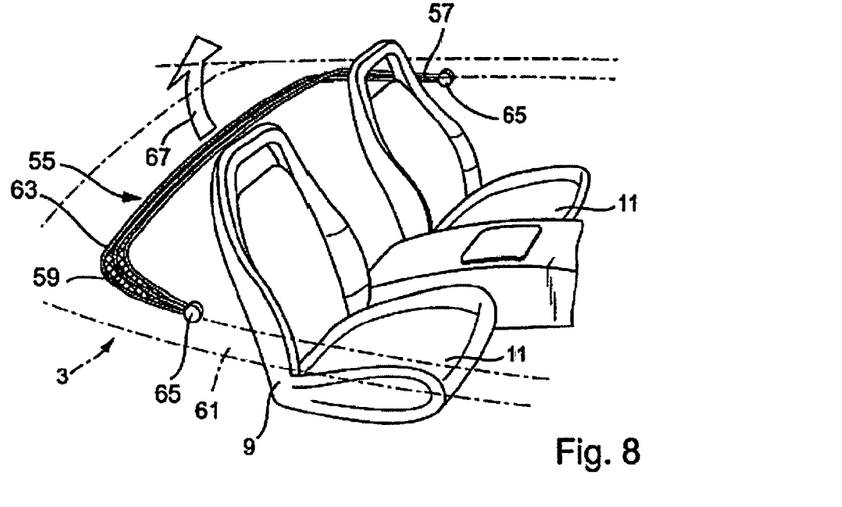
FIGS. 8 and 9 illustrate a schematic three-dimensional view, seen from the front at an angle from above, of a portion of a motor vehicle having a cover, extendable by means of hoops, in the protecting position or the rest position, respectively.
Figure 9:
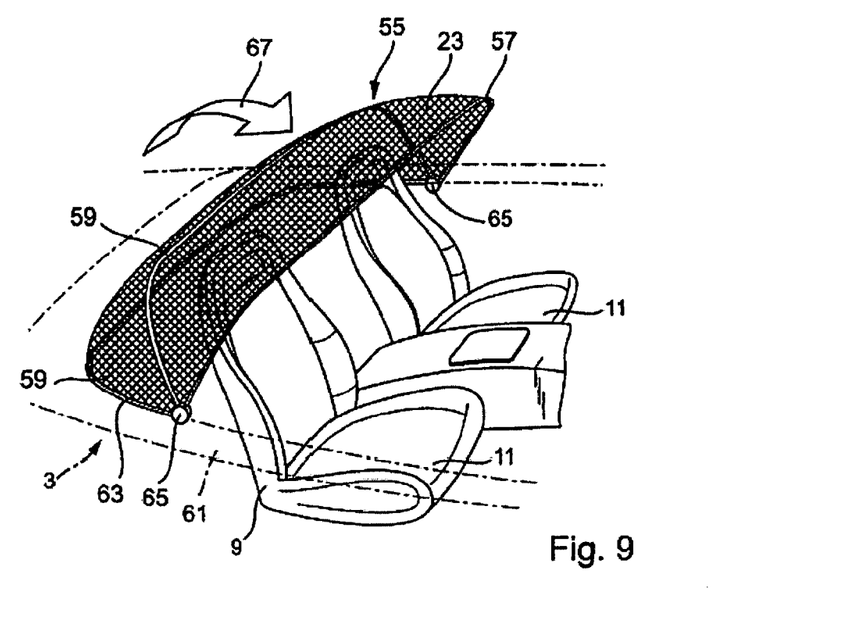

FIGS. 8 and 9 each illustrate a schematic three-dimensional view of a portion of vehicle 3 with a further embodiment of a cover 55. Cover 55 may be extended by means of a front hoop 57 and a center hoop 59. A covering 23 is present between hoops 57 and 59. Covering 23 is connected to hoops 57 and 59 and to a body 61.

For this purpose, cover 55 may have a rear hoop 63 fastened to the body which likewise is connected to covering 23 for cover 55. Cover 55 also has two swivel bearings 65, likewise associated with body 61, about which the front and center hoops 57 and 59, respectively, may be swiveled for extending or storing cover 55. The swivel motion for moving cover 55 from the rest position, as illustrated in FIG. 8, to the protecting position, as illustrated in FIG. 9, is indicated by two curved arrows 67. For this purpose, hoops 57 and 59 are swiveled upward and forward in the direction of passenger compartment 29 of vehicle 3, i.e., above occupants 7 of the vehicle.

In the position illustrated in FIG. 9, covering 23 for cover 55 is thus located between the occupants possibly sitting in vehicle 3 and the enveloping surface of roof 5, which in FIGS. 8 and 9 is stored and therefore not visible.

Figure 10:
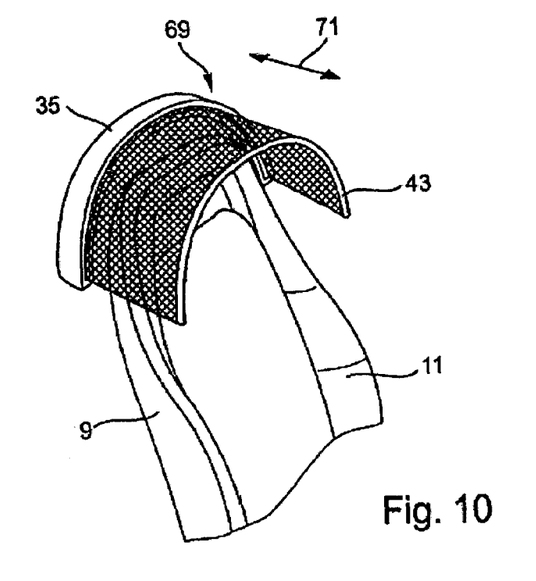
FIG. 10 illustrates a schematic three-dimensional view of a portion of a seat of a motor vehicle, and an embodiment of a cover having a curved design, designed to cover a seat.

FIG. 10 illustrates a schematic three-dimensional view of a portion of seat 11 in vehicle 3, with a further embodiment of a cover 69 having a curved design. In contrast to the covers previously shown, cover 69 is designed solely to protect only one occupant, i.e., to cover the head region of only one of seats 11 of vehicle 3. For this purpose, cover 69 has a highly curved, approximately semicircular design and has a correspondingly highly curved roller shade 35 and a correspondingly curved tension rod 43. A corresponding drive mechanism (not illustrated in FIG. 10) moves tension rod 43 relative to roller shade 35 in such a way that the latter may be rolled in or out, as indicated by a double arrow 71. The extended cover 69, as illustrated in FIG. 10, is thus able to at least partially enclose in an approximately semicircular shape the head of occupant 7 possibly sitting on seat 11 of vehicle 3, thereby providing protection from influences such as those produced by roof 5 as the roof moves between its stored and closed positions.

Figure 11:
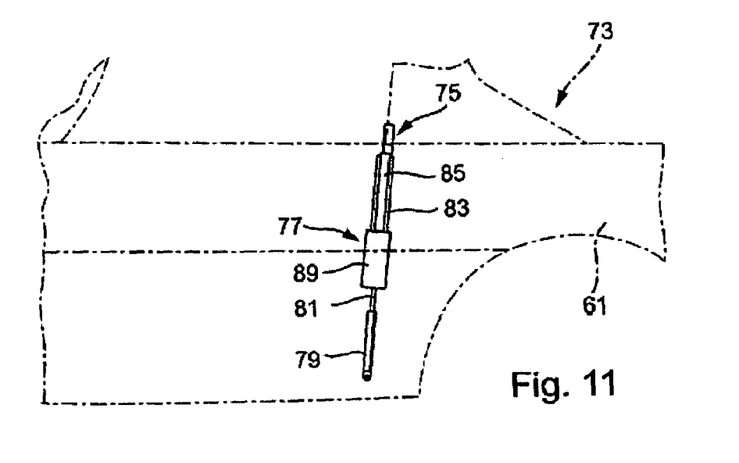
FIG. 11 illustrates a schematic partial side view of a motor vehicle having a drive for a cover, the cover being in the rest position.
Figure 12:
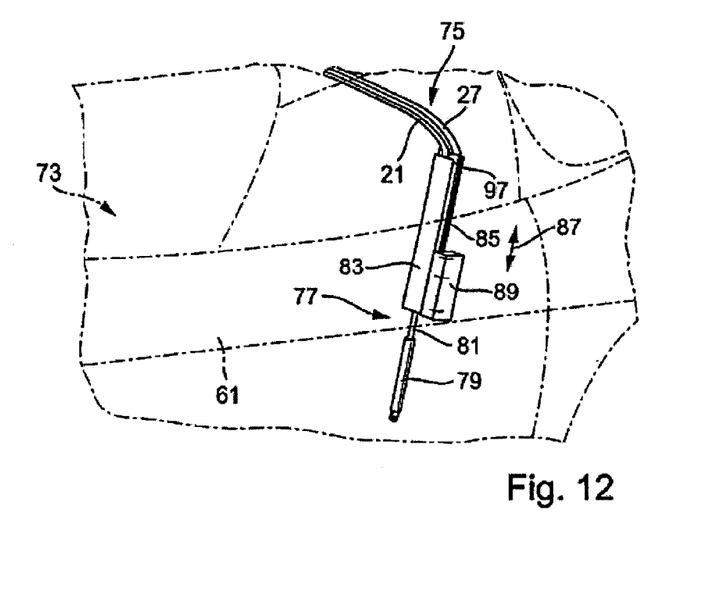
FIGS. 12 and 13 illustrate schematic, partially three-dimensional views of the drive from FIG. 11, seen from the front at an angle from above, illustrated with or without a cover, respectively.
Figure 13:
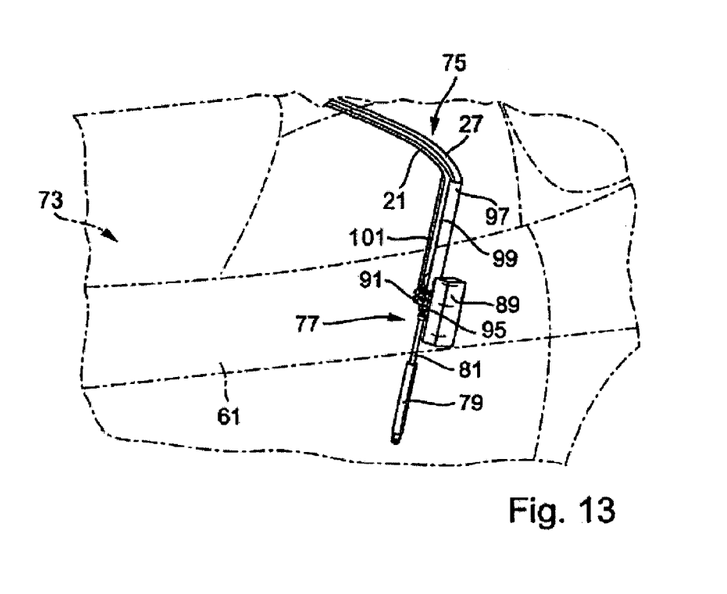

FIG. 11 illustrates a schematic partial side view of a motor vehicle 73 having a cover 75 with a drive 77. FIGS. 12 and 13, seen from the front at an angle from above, each show a schematic, partially three-dimensional view of vehicle 73 which is partially illustrated in FIG. 11. In contrast to FIGS. 11 and 12, in FIG. 13 drive 77 is only partially illustrated.

FIGS. 11 through 13 illustrate cover 75 in a rest position in which the cover is located at least partially in the interior of vehicle 73, approximately behind the seats of the vehicle. The mode of operation of cover 75 corresponds to the mode of operation of cover 1 described in FIGS. 1 through 4. With regard to the description of identical or functionally equivalent parts, reference is therefore made to FIGS. 1 through 4. Drive 77 has a hydraulic cylinder 79 having a strut 81.

As seen in FIG. 12, strut 81 for hydraulic cylinder 79 opens into a cover which is designed as a slide tube 83. Slide tube 83 is associated in a fixed manner with a body 61 of vehicle 73. Slide tube 83 is a rectangular hollow profile which is open on one side by virtue of a slot 85. In the rest position as illustrated in FIGS. 11 through 13, cover 75 is at least partially located inside slide tube 85. In particular, side parts of hoop 21 and of frame 27 for cover 69 are located inside slide tube 83. Hydraulic cylinder 79 is designed to move hoop 21 and frame 27 upward or downward, seen in the configuration of FIG. 12, inside slide tube 83 as indicated by a double arrow 87.

Figure 14:
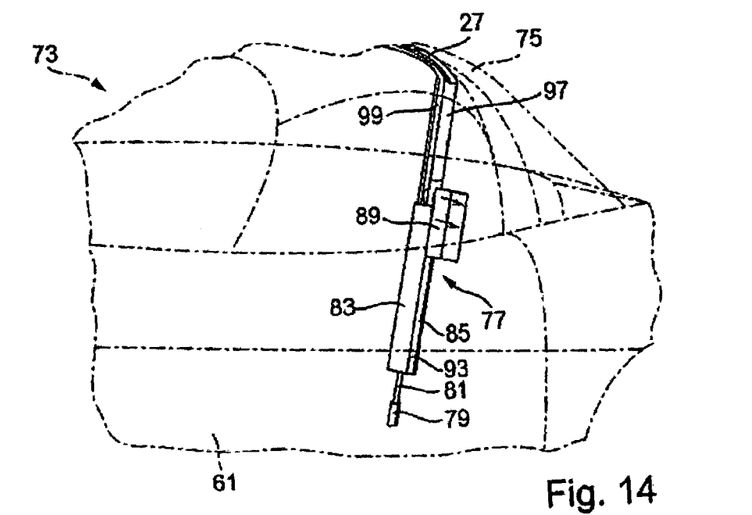
FIGS. 14 and 15 illustrate illustrations analogous to FIGS. 12 and 13 in which the cover is in a middle position between its rest position and its protecting position.
Figure 15:
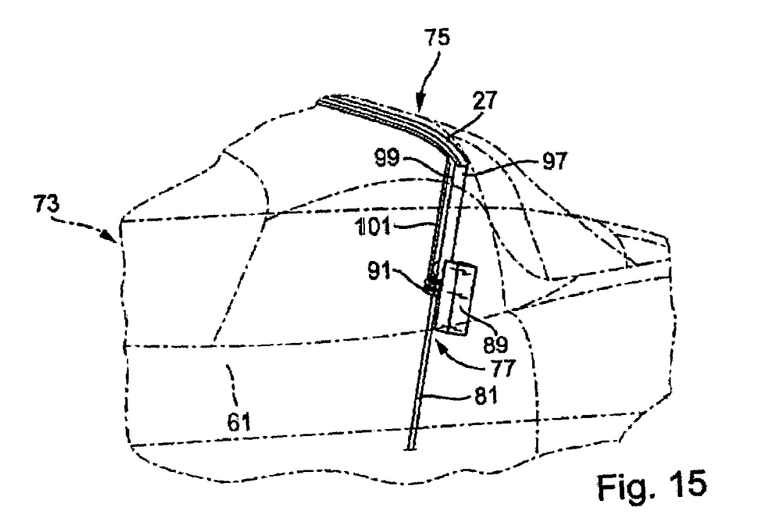

FIGS. 14 and 15 illustrate vehicle 73 in the illustration as in FIGS. 12 and 13, except that cover 75 is in a middle position. FIG. 15 illustrates drive 77 for cover 75, without slide tube 83. In the middle position, as illustrated in FIGS. 14 and 15, strut 81 for hydraulic cylinder 79 of drive 77 is fully extended, i.e., linearly moved upward in the configuration of FIGS. 14 and 15.

Figure 16:
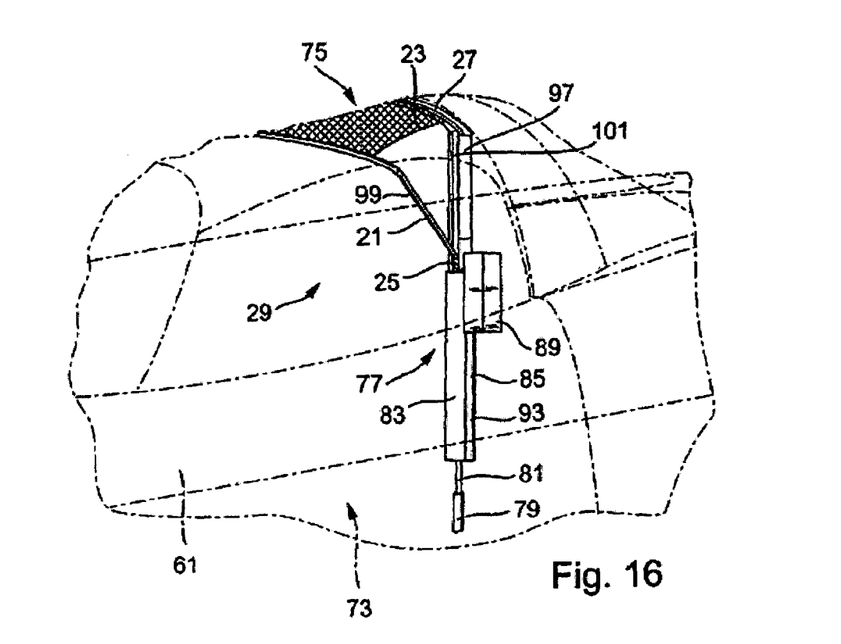
FIG. 16 illustrates a view of the drive, analogous to FIGS. 12 through 15, in which the cover is in its protecting position.
Figure 17:
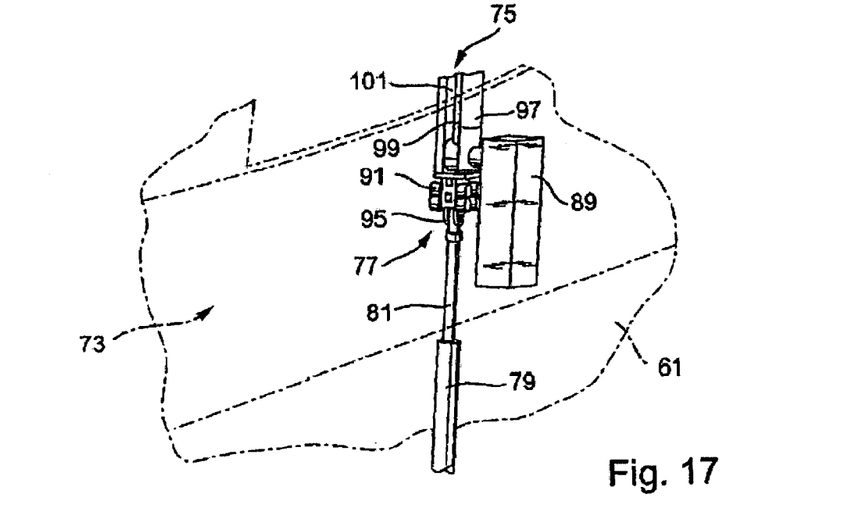
FIG. 17 illustrates a detailed view of the drive without the cover, in the position illustrated in FIG. 15.

FIG. 16 illustrates vehicle 73 in an illustration according to FIGS. 12 through 15, except that cover 75 is in a protecting position. FIG. 17 illustrates a detailed view of drive 77 according to the view of FIG. 15.

The mode of operation of drive 77 is explained in greater detail below, with reference to FIGS. 11 through 17. Drive 77 has a swivel bearing 25 which pivotably connects hoop 21 to frame 27 of cover 75. The pivotably supported hoop 21 is also connected to a rotation unit 89 for drive 77. Rotation unit 89 may be any given rotational drive, for example an electric drive, hydraulic drive, and/or pneumatic drive. The swivel axis of rotation unit 89 corresponds to the axis of swivel bearing 25, and is associated in a fixed manner with hoop 21. Rotation unit 89 is therefore used to swivel hoop 21. Thus, to move cover 75 from its rest position, as illustrated in FIGS. 11 through 13, to the middle position, as shown in FIGS. 14 and 15, strut 81 for hydraulic cylinder 89 is first extended, causing cover 75 together with rotation unit 89 to undergo translational motion. To ultimately extend covering 23 above the occupants of vehicle 73, hoop 21 is swiveled in the direction of passenger compartment 29 of vehicle 73 by means of rotation unit 89 for hoop 21. Cover 75 is retracted in the reverse sequence.

As seen in FIG. 17, drive 77 has a total of eight slide rollers 91, of which only six are visible in FIG. 17. Slide rollers 91 are used to conduct the translational motion, forced by hydraulic cylinder 79, to inner areas 93 of slide tube 83 as seen in FIG. 16. Slide tube 83 and slide rollers 91 thus form a slide bearing corresponding to the translational drive of hydraulic cylinder 79. Slide rollers 19 are coupled to strut 81 for hydraulic cylinder 79 via a swivel bearing 95. Swivel bearing 95 may be produced by known means, such as by a pin fixed in boreholes by means of a press fit. Slide rollers 91 are also securely coupled to frame 27 of cover 69. In FIGS. 16 and 17, it is also seen that frame 27 has a side part 97 which is designed so that it can accommodate a side part 99 of hoop 21. To this end, side part 97 of frame 27 is designed as a hollow profile having a slot 101 into which side part 99 of hoop 21 may be swiveled by means of rotation unit 89. In the rest position as illustrated in FIGS. 11 through 13, side part 99 of hoop 21 is located inside side part 97 of frame 27 for cover 75. Side part 97 of frame 27 in turn is located inside slide tube 83, which is associated with vehicle 73 in a fixed manner. Instead of hydraulic cylinder 79 any other translational drive may be provided, for example to drive slide rollers 91.

Figure 18:
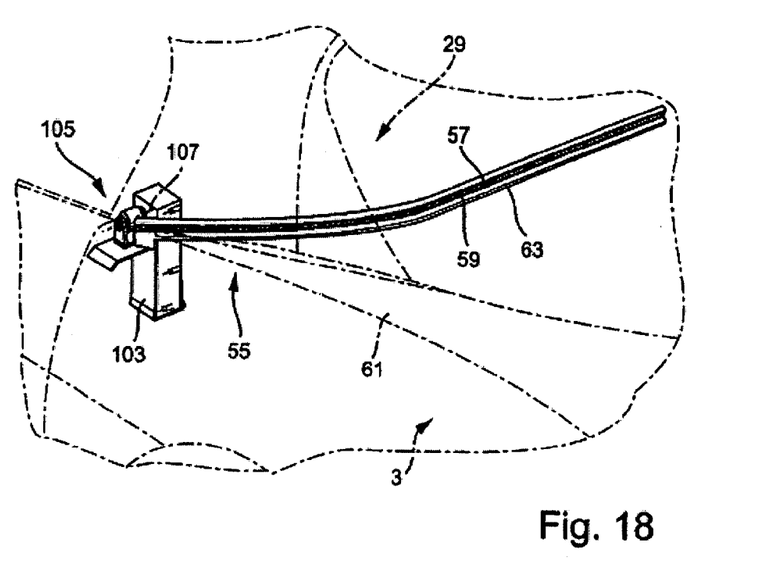
FIG. 18 illustrates a partial three-dimensional illustration of a motor vehicle, seen from the rear at an angle from above, with a drive for a cover, the cover being in its rest position.
Figure 19:
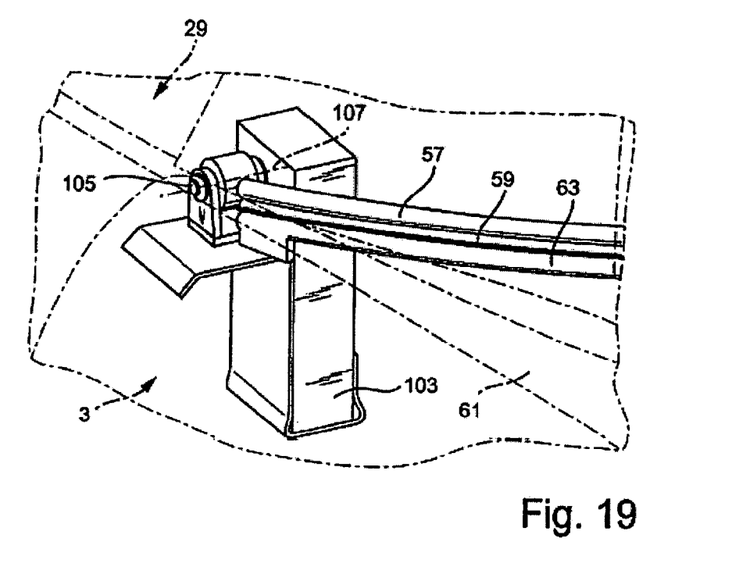
FIG. 19 illustrates a detailed view of the drive illustrated in FIG. 18.
Figure 20:
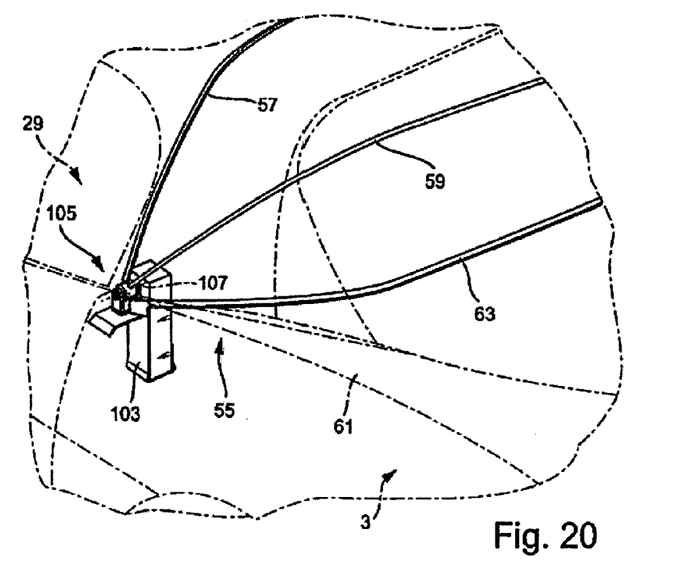
FIG. 20 illustrates the drive in the illustration according to FIG. 18, but moved to the protecting position.
Figure 21:
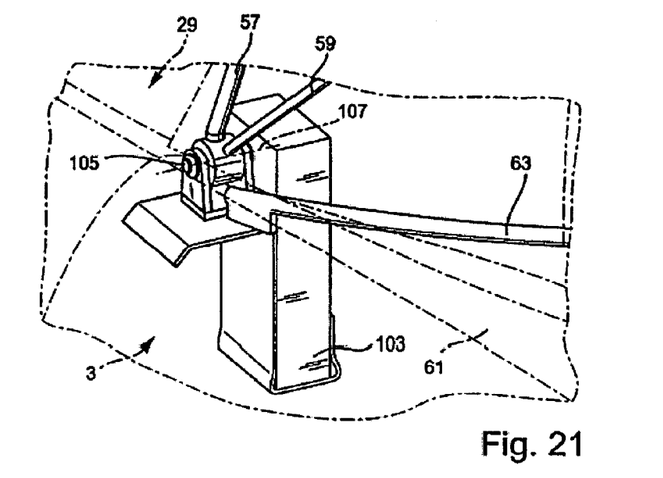
FIG. 21 illustrates a detailed view of the drive illustrated in FIG. 20.

FIG. 18 illustrates a partial three-dimensional illustration of motor vehicle 73, seen from the rear at an angle from above, with a cover 55 analogous to the illustrations of FIGS. 8 and 9. FIG. 19 illustrates a detailed view of a drive 103 for cover 55. FIGS. 20 and 21 illustrate the same views as in FIGS. 18 and 19, except that cover 55 is in its protecting position.

Drive 103 for cover 55 has a swivel bearing 105 having a swivel axis 107. Drive unit 103 is used to produce a swivel motion of front hoop 57 for cover 55 about swivel axis 107 of swivel bearing 105.

Covering 23 for cover 55 (not illustrated in FIGS. 18 through 21) causes a center hoop 59 to also correspondingly swivel. Thus, center hoop 59 is not directly connected to swivel axis 107 of swivel bearing 105. Instead, center hoop is swiveled directly by means of covering 33. For this purpose, center hoop 59 is connected to covering 33. Thus, to move cover 55 from its rest position (as illustrated in FIGS. 18 and 19) to its protecting position (as illustrated in FIGS. 20 and 21), it is only necessary for front hoop 57 to be swiveled upward and forward toward passenger compartment 29 by means of drive 103. Drive 103 may be, for example, a hydraulic, pneumatic, and/or electric drive.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A covering apparatus for protecting motor vehicle occupants from an openable roof of the vehicle in which the roof is movable along an enveloping surface between a stored position in which the roof is opened and a closed position in which the roof is closed, the apparatus comprising:

a cover movable between a rest position in which the cover is stowed and a protecting position in which the cover is extended, wherein the cover moves between the rest position and the protecting position without intersecting the enveloping surface of the roof prior to or during movement of the roof between the stored and closed positions of the roof.

2. The apparatus of claim 1 wherein:
the cover extends over the head of an occupant of the vehicle when the cover is in the protecting position.

3. The apparatus of claim 1 wherein:
the cover includes a roller shade.

4. The apparatus of claim 1 wherein:
the cover includes a pivotably supported hoop configured to move the cover between the rest position and the protecting position of the cover.

5. The apparatus of claim 1 wherein:
the cover moves translationally when moving between the rest position and the protecting position of the cover.

6. The apparatus of claim 5 wherein:
the cover is rolled-in or folded-up when the cover is in the rest position, wherein the cover translationally moves to the rolled-in or folded-up state.

7. The apparatus of claim 1 further comprising:
a drive mechanism for moving the cover between the rest position and the protecting position of the cover.

8. The apparatus of claim 7 wherein:
the drive mechanism includes a linear drive.

9. The apparatus of claim 7 wherein:
the drive mechanism includes a rotational drive.

10. The apparatus of claim 7 wherein:
the drive mechanism includes at least one of an electric, pneumatic, and hydraulic drive.

11. The apparatus of claim 7 wherein:
the drive mechanism includes a slide tube.

12. A motor vehicle comprising:
a roof movable along an enveloping surface between a stored position in which the roof is opened and a closed position in which the roof is closed;
a cover movable between a rest position in which the cover is stowed within the vehicle interior and a protecting position in which the cover is extended within the vehicle interior over a portion of a seat of the vehicle, wherein the cover moves between the rest position and the protecting position without intersecting the enveloping surface of the roof prior to or during movement of the roof between the stored and closed positions of the roof, wherein in the protecting position the cover is located between the vehicle interior and the enveloping surface defined by the opening and closing motion of the roof to protect occupants of the vehicle from the roof.

13. The vehicle of claim 12 wherein:
the cover extends over the head of an occupant of the vehicle when the cover is in the protecting position.

14. The vehicle of claim 12 wherein:
the cover includes a roller shade.

15. The vehicle of claim 12 wherein:
the cover includes a pivotably supported hoop configured to move the cover between the rest position and the protecting position of the cover.

16. The vehicle of claim 12 wherein:

the cover moves translationally approximately in the direction of the vertical axis of the vehicle when moving between the rest position and the protecting position of the cover.

17. The vehicle of claim 16 wherein:

the cover is rolled-in or folded-up when the cover is in the rest position, wherein the cover translationally moves to the rolled-in or folded-up state.

18. The vehicle of claim 12 further comprising:

a drive mechanism for moving the cover between the rest position and the protecting position of the cover.

19. The vehicle of claim 18 wherein:

the drive mechanism includes one of a linear drive and a rotational drive.

20. The vehicle of claim 18 wherein:

the drive mechanism includes at least one of an electric, pneumatic, and hydraulic drive.

* * * * *